May 31, 1966
J. KÄGI
3,253,994
METHOD OF CONTROLLING A NUCLEAR REACTOR
PLANT AND APPARATUS THEREFOR
Filed Sept. 5, 1963
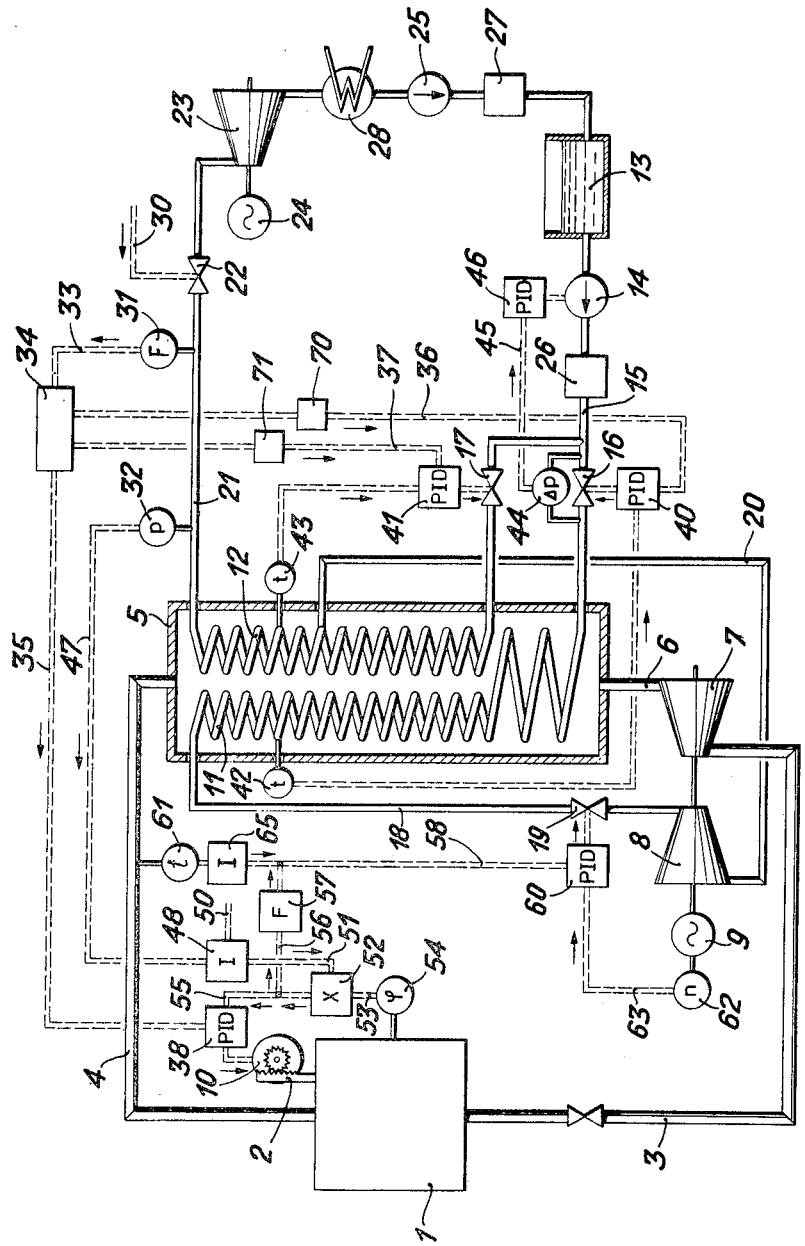
Inventor:
JAKOB KÄGI
By K. A. Mayr.
ATTORNEY.

United States Patent Office 3,253,994
Patented May 31, 1966

3,253,994
METHOD OF CONTROLLING A NUCLEAR REACTOR PLANT AND APPARATUS THEREFOR
Jakob Kägi, Winterthur, Switzerland, assignor to Sulzer Brothers Ltd., Winterthur, Switzerland, a corporation of Switzerland
Filed Sept. 5, 1963, Ser. No. 306,936
Claims priority, application Switzerland, Sept. 10, 1962, 10,689/62
7 Claims. (Cl. 176—20)

The present invention relates to a method of and apparatus for controlling a steam plant operating under variable load conditions and including a nuclear reactor, a steam generator and a steam consumer, the heat generated in the reactor being transmitted to the steam generator by a heat carrier fluid circulating through the nuclear reactor for receiving heat therefrom and through the steam generator for heating the latter.

In conventional systems of this type the speed of circulation of the heat carrier fluid which is the coolant for the reactor is changed upon a change of the load on the plant. A nuclear reactor is very sluggish with respect to output changes. The aforedescribed conventional arrangement can cope only with slow changes of the load on the steam plant.

It is an object of the present invention to provide a steam plant operating under variable load conditions and receiving heat for steam generation from a nuclear reactor by indirect heat transfer from the reactor coolant to the operating medium of the steam generator, whereby changes of the output of the plant, particularly increases of the output, are effected more quickly than in conventional plants. This object is obtained by making the heat generation in the reactor directly and immediately responsive to the load on the steam plant and by regulating the circulating speed of the heat carrier in response to the actual heat generation in the reactor.

A plant according to the invention comprises a nuclear reactor, a steam generator, a steam consumer, and means for circulating a heat carrier through the nuclear recator to act as coolant therein and through the steam generator for heating same. The plant also comprises an output adjusting apparatus which defines the output of the steam plant and which directly actuates means for controlling the heat generation in the reactor, means for controlling the speed of circulation of the heat carrier, means responsive to an operating characteristic of the reactor, for example the heat generated therein, and means for connecting said means for controlling the speed of circulation of the heat carrier and said means responsive to an operating characteristic of the reactor for controlling said circulating speed in response to said operating characteristic of the reactor.

The arrangement according to the invention makes it possible to more quickly change the output of the steam plant by utilizing the steam generator of the plant as a heat accumulator. If an increase of the output of the plant is intended, the reactor is immediately adjusted to produce the required heat. Since the actual heat generation in the reactor changes very slowly a simultaneous increase of the circulating velocity of the heat carrier results in a supply of relatively cool heat carrier to the steam generator whereby heat is withdrawn from the generator by the heat carrier. With the arrangement according to the invention such a temperature reduction is avoided because the circulating velocity of the heat carrier is not changed until the reactor generates the new desired heat.

The novel features which are considered characteristic of the invention are set forth with particularity in the appended claims. The invention itself, however, and additional objects and advantages thereof will best be understood from the following description of embodiments thereof when read in connection with the accompanying drawing, the one figure of which schematically illustrates a plant according to the invention.

Referring more particularly to the drawing, numeral 1 designates a nuclear reactor provided with control rods 2 and a conduit 3 for supplying a coolant to the reactor and a conduit 4 for withdrawing the coolant from the reactor The conduit 4 is connected to a steam generator 5 for supplying the heated coolant thereto. The coolant leaving the steam generator is conducted through a conduit 6 to a circulating pump 7 which returns the coolant to the conduit 3. The circulating pump 7 may be driven either by a steam turbine 8 or by an electric motor 9. The control rods 2 are actuated by a servomotor 10.

The steam generator 5 comprises a high pressure tubular heating surface 11 and a low pressure tubular heating surface 12. Both heating surfaces are heated by the heat carrier received from the reactor 1 for indirectly heating the operating medium flowing through the heating surfaces. The latter are supplied by a feed pump 14 with feedwater from a feedwater reservoir 13. The pump 14 delivers feedwater through a feed pipe 15 to throttle valves 16 and 17. The valve 16 controls feedwater supply to the heating surface 11 and the valve 17 controls feedwater supply to the heating surface 12. The operating medium leaving the heating surface 11 is conducted through a pipe 18 provided with a throttle valve 19 to a turbine 8. The exhaust of the turbine 8 is conducted through a pipe 20 to a portion of the heating surface 12 wherein the temperature of the operating medium corresponds to the temperature of the operating medium leaving the turbine 8. A pipe 21 which is provided with a throttle valve 22, connects the outlet of the heating surface 12 to a turbine 23 driving an electric generator 24. The exhaust of the turbine 23 flows into a condenser 28 from which the condensate is returned by condensate pump 25 to the feedwater reservoir 13. A preheater 26 may be arranged downstream of the feed pump 14 and a preheater 27 may be arranged downstream of the condensate pump 25. The throttle valve 22 in the pipe line 21 which defines the final steam output of the entire plant is actuated in response to a control signal transmitted to a motor operator, not shown, of the valve 22 through a signal conduit 30. This control signal may correspond to the speed of the generator 24 or may be furnished by a program transmitter, not shown. A rate of flow responsive device 31 and a pressure responsive device 32 are inserted in the pipe line 21 upstream of the throttle valve 22. The signal produced by the device 31 is transmitted through a conduit 33 to an output adjusting apparatus 34. The latter produces a control signal corresponding to the rate of flow of steam in the pipe 21. This signal is transmitted into conduits 35, 36 and 37. The conduit 35 is connected to a regulator 38 having a proportional, integral, differential (PID) character which controls the servomotor 10 for actuating the control rods 2. The conduits 36 and 37 are connected to regulators 40 and 41, respectively, having a proportional, integral, differential (PID) character, the regulator 40 controlling the throttle valve 16 and the regulator 41 controlling the throttle valve 17. In addition to the control of the regulators 40 and 41 by the signals arriving through the conduits 36 and 37 the regulator 40 is also controlled in response to signals corresponding to the temperature measured by a device 42 at an intermediate part of the heating surface 11 and the regulator 41 is controlled by signals corresponding to the temperature measured by a device 43 at an intermediate portion of the heating surface 12.

A device 44 is responsive to the difference between the pressure of the feedwater upstream and downstream of the throttle valve 16 and transmits a corresponding control signal through a conduit 45 to a regulator 46 having a proportional, integral, differential (PID) character which controls the speed of the feed pump 14 and therefore the rate of feedwater supply.

The pressure responsive device 32 transmits a signal through a conduit 47 to an integrating device 48 which compares the signal arriving through conduit 47 with a set point signal which may be supplied through a conduit 50. A signal corresponding to the integral of the deviation of the signal produced by the device 32 from its set point is conducted through a conduit 51 to a multiplying device 52. The latter also receives through a conduit 53 a signal produced by a device 54 which is responsive to the neutron flux $\varphi$ in the reactor. A signal corresponding to the result of the multiplication of the signals introduced into the device 52 is conducted through a conduit 55 to the regulator 38. A conduit 56 is connected to the conduit 55 and is provided with a function transmitter 57. The latter transmits a signal resulting from the signal in the conduit 55 to a conduit 58 which terminates in a regulator 60 having a proportional, integral, differential (PID) character for controlling the operation of the throttle valve 19. Signals produced by a device 61 which is responsive to the temperature of the heat carrier flowing through pipe 4 are conducted through an integrating device 65 to the conduit 58 and the regulator 60. The turbine 8 is provided with a device 62 which transmits signals corresponding to the speed of the turbine 8 through a conduit 63 to the regulator 60.

A change of load on the turbine 23 which may be caused by connecting current consumers to the generator 24 or by a program transmitter which predetermines the load on the plant, results in a change of the rate of flow of steam through the throttle valve 22. This change of rate of steam flow is sensed by the device 31 which transmits a corresponding control signal to the load-adjusting apparatus 34. The latter immediately transmits signals through the conduit 35 to the regulator 38 for actuating the servomotor 10 and effecting movement of the control rods 2 according to the change of load. The output-adjusting apparatus 34 also transmits control signals through conduits 36 and 37 to the motor operators 40 and 41 of the valves 16 and 17, respectively, whereby a corresponding change of the operating medium fed into the heating surfaces 11 and 12 is effected. Adjustment of the throttle valve 19 and the speed of the turbine 8 driving the circulating pump 7 is not effected until the neutron flux responsive device 54 indicates a change of the neutron flux in the reactor corresponding to the adjustment of the control rods 2. Since the neutron flux sensing device may produce signals not truly corresponding to the heat generation in the reactor, the signal produced by the device 54 is corrected by signals produced in the device 32 and corresponding to the steam pressure in the steam main 21 and by signals produced in the device 61 which correspond to the temperature of the heat carrier fluid flowing from the reactor 1 to the steam generator 5.

The arrangement according to the invention may be improved by the use of signal transmission delaying devices 70 and 71 interposed in the signal conduits 36 and 37, respectively. These delaying devices, which are well known in the automatic control art, delay transmission of the signals produced by the output-adjusting apparatus 34 to the regulators 40 and 41. Due to the provision of the aforesaid delaying devices the feedwater supply is not adjusted immediately corresponding to changes of steam consumption. For example, increased steam consumption is followed by increased feedwater supply only after a predetermined lapse of time. In this way the pressure of the live steam may be reduced during short periods of time after an increase of steam consumption. This pressure reduction effects additional steam generation by heat accumulated in the steam generator 5. Delay of the feedwater supply relative to the steam outflow makes it possible to make full use of the heat capacity of the steam generator at a sudden increase of the load.

The output-adjusting apparatus 34 is conventional and is used in modern steam generating plants. Instead of controlling the output apparatus 34 in response to signals produced by a rate of steam flow measuring device, as shown, the output-adjusting apparatus 34 may be controlled by the steam pressure responsive device 32 whereby an integral regulator is interposed between the device 32 and the apparatus 34.

The valve 22 may be actuated in response to the steam pressure measured by the device 32. In this case a predetermined pressure can be maintained in the steam generator and the apparatus 34 can be actuated by hand or by a program transmitter, or in response to a value corresponding to the output of the plant, for example, the speed of the turbine 23 or the power produced by the electric generator 24.

Whereas in the foregoing specification and in the claims a steam generator, a steam consumer, and feedwater supply means are described and specified, the invention is equally well applicable to plants using a different substance as operating medium.

I claim:
1. The method of controlling a steam plant from a nuclear reactor, comprising:
    circulating an operating medium in the form of water through a steam generator for vaporizing the water, and through a steam consumer operating under variable load conditions,
    circulating a heat carrier fluid which is different from said operating medium in a separate circuit through the nuclear reactor for receiving heat therefrom and through the steam generator for indirectly transferring heat to said operating medium,
    coordinating the heat generation in the reactor directly and immediately with the load on the plant upon each change of load,
    controlling the velocity of the circulation of the heat carrier fluid in response to the heat generation in the reactor and coordinating the rate of feedwater supply to the steam generator with the load on the plant at each change of the load.
2. The method defined in claim 1 comprising immediately coordinating the rate of feedwater supply to the steam generator with the load on the plant at each change of the load.
3. The method defined in claim 1 comprising retardedly coordinating the rate of feedwater supply to the steam generator with the load on the plant at each change of the load.
4. A steam plant operating under variable load conditions comprising:
    a nuclear reactor,
    a steam generator,
    a steam consumer,
    means for circulating on operating medium in a first circuit in the form of water through said steam generator for vaporizing the water and through said steam consumer which operates under variable load conditions,
    means for circulating a heat carrier in a second circuit through said reactor for receiving heat therefrom and through said steam generator for indirectly heating the operating medium of the latter,
    an output-adjusting apparatus for adjusting the output of the plant,
    a regulating means for regulating the heat generation in the reactor,
    means operatively connecting said output-adjusting apparatus to said regulating means for directly actuating said regulating means for coordinating the heat generation in the reactor with the adjusted output of the plant, said circulating means including means for controlling the speed of circulation of the heat carrier, and means responsive to the heat generation in the reactor, said last mentioned means being operatively connected to said means for controlling the speed of circulation of the heat carrier, for coordinating the speed of circulation of the heat carrier with the heat generation in the reactor.

5. A steam plant as defined in claim 4 comprising means for controlling the rate of feedwater supply to said steam generator, said rate of feedwater supply control means being operatively connected to said output-adjusting apparatus for controlling the rate of feedwater supply in response to the adjusted output of the plant.

6. A steam plant according to claim 4 comprising control signal responsive means for controlling the rate of feedwater supply to said steam generator, said output-adjusting apparatus comprising means for producing control signals corresponding to the desired output of the plant, signal conduit means interconnecting said output-adjusting apparatus and said rate of feedwater supply control means for transmitting the control signals from said output-adjusting apparatus to said rate of feedwater supply control means, and means interposed in said signal conduit means for delaying transmission of said signals from said output-adjusting apparatus to said rate of feedwater supply control means.

7. A steam plant operating under variable load conditions comprising:
 a nuclear reactor,
 a steam generator,
 a steam consumer receiving steam from said steam generator,
 means for circulating a heat carrier fluid through said reactor for receiving heat therefrom and through said steam generator for heating the latter,
 an output-adjusting apparatus for adjusting the output of the plant,
 a regulating means for regulating the heat generation in the reactor,
 means operatively connecting said output-adjusting apparatus to said regulating means for directly actuating said regulating means for coordinating the heat generation in the reactor with the adjusted output of the plant,
 said circulating means including means for controlling the speed of circulation of the heat carrier,
 means producing control signals corresponding to the neutron flux in the reactor,
 means producing control signals corresponding to the temperature of the heat carrier fluid leaving said reactor, and
 means for combining said control signals corresponding to the neutron flux and the control signals corresponding to the temperature of the heat carrier leaving said reactor for producing a combined signal,
 said last mentioned means being operatively connected to said means for controlling the speed of circulation of the heat carrier, for controlling the speed of circulation of the heat carrier in response to the combined signal.

References Cited by the Examiner

UNITED STATES PATENTS

| 2,193,868 | 3/1940 | Egloff | 60—107 |
| 3,042,600 | 7/1962 | Brooks | 176—20 |

FOREIGN PATENTS 811,856   4/1959   Great Britain.

OTHER REFERENCES

Schultz: "Control of Nuclear Reactors and Power Plants," 1961, chap. 8, p. 251, publ. by McGraw-Hill.

REUBEN EPSTEIN, *Primary Examiner.*

CARL D. QUARFORTH, *Examiner.*

M. R. DINNIN, *Assistant Examiner.*